United States Patent

Murakami et al.

Patent Number: 5,387,264
Date of Patent: Feb. 7, 1995

[54] METHOD FOR DYEING OR COLORING ORGANIC MACROMOLECULAR SUBSTANCE BY USING COUMARIN COMPOUND OR COLORING MATERIAL

[75] Inventors: Yasuo Murakami, Kawaguchi; Ryuzo Orita, Showa; Tadaaki Sugimoto, Kawaguchi; Masao Ohnishi, Saitama, all of Japan

[73] Assignee: Nippon Kayaku Kabushiki Kaisha, Tokyo, Japan

[21] Appl. No.: 220,883

[22] Filed: Mar. 31, 1994

[30] Foreign Application Priority Data

Apr. 7, 1993 [JP] Japan .................. 5-103757
Apr. 19, 1993 [JP] Japan .................. 5-114169

[51] Int. Cl.⁶ .................................. C09B 57/02
[52] U.S. Cl. .................................. 8/648; 546/45; 8/509; 8/514; 8/922
[58] Field of Search ............ 546/64, 68, 69, 45; 8/509, 514, 922, 648

[56] References Cited

U.S. PATENT DOCUMENTS 3,880,869  4/1975  Scheuermann et al. .......... 546/51

FOREIGN PATENT DOCUMENTS 465551  11/1968  Switzerland .

*Primary Examiner*—Paul Lieberman
*Assistant Examiner*—Margaret Einsmann
*Attorney, Agent, or Firm*—Nields & Lemack

[57] ABSTRACT

The invention discloses a method for dyeing a hydrophobic fiber, in particular, a polyester fiber in an extremely brilliant yellow or orange with fluorescence, a method for coloring, for example, a polystyrene resin or a polyacrylate resin in a brilliant yellow or orange, and a coloring material therefore.

A method for dyeing a hydrophobic fiber and a method for coloring an organic macromolecular substance characterized by using a coumarin compound represented by the general formula:

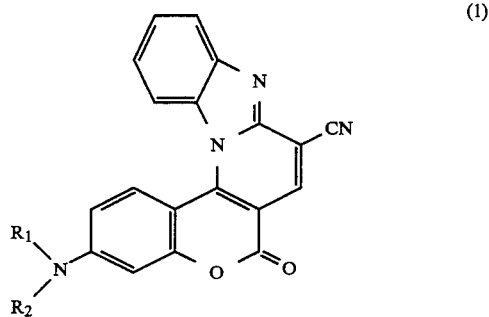

(1)

wherein $R_1$ and $R_2$ independently represent each a hydrogen atom or an alkyl group having 1 to 4 carbon atoms;

and a coloring material containing the coumarin compound are disclosed.

8 Claims, No Drawings

METHOD FOR DYEING OR COLORING ORGANIC MACROMOLECULAR SUBSTANCE BY USING COUMARIN COMPOUND OR COLORING MATERIAL

BACKGROUND OF THE INVENTION

This invention relates to a method for dyeing a hydrophobic fiber. More particularly, it relates to a method for dyeing a hydrophobic fiber in particular, a polyester fiber in an extremely brilliant yellow or orange with various excellent fastnesses and fluorescence by using a coumarin compound. The present invention further relates to a method for coloring organic macromolecular substances applicable to, for example, the raw materials of various electric and electronic parts and automotive parts and to a coloring material usable in these macromolecular substances, colored toners for electrophotography and fluorescent pigments.

In recent years, consumers' growing interest in leisure and choice of high-grade goods present an ever-increasing demand for sports wear with brilliant colors. In particular, there has been urgently required to develop a dye, which is capable of giving a brilliant color and excellent in various fastnesses for dyeing polyester fibers or blends of polyester fibers with other fibers.

And recently, there appears an ultra fine polyester microfiber as a novel synthetic fiber. This so-called microfiber has a tendency to show a low apparent depth of shade compared with a regular fiber which has been dyed with the same dye at the same color concentration. In order to dye the microfiber so as to give the same depth of shade, therefore, it is required to use a large amount of a dye compared with the case of dyeing a regular fiber. As a result, it is sometimes observed that various fastnesses is deteriorated thereby. Thus it is furthermore strongly required to develop a disperse dye which is excellent in various fastnesses, in particular, lightfastness and wetfastness and gives an extremely brilliant color.

Meanwhile, to color synthetic macromolecular substances in yellow, there have been used oil-soluble dyes such as anthraquinone dyes, quinophthalone dyes and perinone dyes and organic pigments such as anthraquinone pigments, isoindolinone pigments and quinophthalone pigments.

The present inventors have conducted extensive studies in order to develop a dye whereby polyester fibers or blends of polyester fibers with other fibers can be dyed with excellent dyeing affinity and a dyed fiber being excellent in various fastnesses and having an extremely brilliant color can be provided.

In the field of the coloration of organic macromolecular substances, each of the above-mentioned coloring agents has both advantages and disadvantages in tinctorial power, saturation and various fastnesses. Although it has been required to develop a coloring material with a more brilliant color in recent years, none of the known coloring agents can provide a satisfactory brightness. Hence, the present inventors have conducted intensive studies from this point of view too.

SUMMARY OF THE INVENTION

As the results of these studies, the present invention has been completed. Accordingly, the present invention provides a method for dyeing and printing or coloring an organic macromolecular substance and a coloring material characterized by using a coumarin compound represented by the following formula (1):

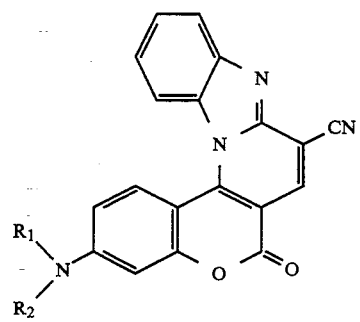

wherein $R_1$ and $R_2$ independently represent each a hydrogen atom or an alkyl group having 1 to 4 carbon atoms.

DETAILED DESCRIPTION OF THE INVENTION

It has been confirmed that the substance dyed by using the compound represented by the above formula (1) has an extremely brilliant yellow color with fluorescence and is excellent in fastnesses to light, sublimation and moisture. It has also been found out that a microfiber dyed in accordance with the method of the present invention has excellent dyeing affinity and suffers from little deterioration in the various fastnesses. It has been furthermore found out that the present invention which provides colored organic macromolecular substances (hereafter called "colored substances") with a coloring agent (material) having an extremely brilliant yellow color and being excellent in tinctorial power and fastnesses, is applicable not only to colored molded materials but also to colored toners for electrophotography and fluorescent pigments.

The compound represented by the above formula (1) can be obtained by, for example, condensing known 7-dialkylamino-3-formyl-4-chlorocoumarin represented by the formula (2):

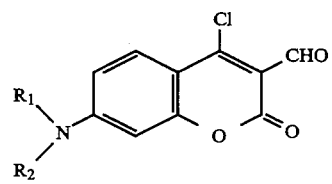

wherein $R_1$ and $R_2$ represent each a hydrogen atom or an alkyl group having 1 to 4 carbon atoms; with known cyanomethylbenzimidazole represented by the following formula (3):

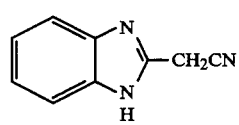

by using a solvent, for example, an alcohol such as isopropyl alcohol, n-butyl alcohol or cyclohexanol, an ether such as dioxane or a ketone such as methyl ethyl ketone or methyl isobutyl ketone, preferably in the presence of pyridine, dimethylformamide or dimethylsulfoxide and preferably with heating to 70° to 110° C.

Examples of the coumarin compound represented by the general formula (1) include those wherein both of $R_1$ and $R_2$ are methyl groups, ethyl groups, n-propyl groups, isopropyl groups, n-butyl groups or isobutyl groups, the one wherein $R_1$ is a methyl group and $R_2$ is an ethyl group, the one wherein $R_1$ is a methyl group and $R_2$ is an n-propyl group and the one wherein $R_1$ is an ethyl group and $R_2$ is an n-butyl group. Among these compounds, those wherein $R_1$ and $R_2$ are both ethyl groups or n-butyl groups are preferable ones.

The coumarin compound of the present invention may be applied to hydrophobic fibers in the following manner. To the coumarin compound represented by the above formula (1) are added a dispersing agent, for example, an anionic dispersing agent such as a naphthalenesulfonic acid/formalin condensate or ligninsulfonic acid or a nonionic dispersing agent such as an ethylene oxide/propylene oxide block copolymer or an ethylene oxide adduct of an alkylphenol and a small amount of water. After thoroughly wet-grinding in a ball mill or a sand mill, the product is used as a pulverized dye in the form of a dried or pasty matter.

In addition to the coumarin compound of the above formula (1) to be used in the present invention, several existing disperse dyes may be used in the form of a combination so as to adjust the hue to the desired level or to improve the fastness and dyeing ability. These powdery dyes may be preliminarily mixed together and then atomized. Alternatively, each dye is first pulverized, then blended together and used for dyeing.

Examples of the hydrophobic fiber which can be dyed with the coumarin compound of the present invention include polyester fibers, polyamide fibers cellulose diacetate fibers, cellulose triacetate fibers and blends of these fibers. Also, blends comprising these fibers and natural fibers such as cotton, silk and wool are usable therefor.

The hydrophobic fiber may be dyed with the coumarin compound of the present invention by any method known per se. For example, the high-pressure and high-temperature dyeing method, the carrier dyeing method, the pad dyeing method, the printing method or the thermosol dyeing method may be used therefor. It is effective to subject the dyed fiber thus obtained to reduction clearing since the fastness of the fiber can be thus improved.

Examples of the organic macromolecular substance to be colored with the coloring material of the present invention include fine particles, pellets, films and molded articles of polyester, polyamide, polystyrene, polyurethane, polyacrylonitrile, polyolefine, polyacrylate, polyvinyl chloride, polyethylene, polycarbonate and polyacetal resins. Also copolymers of these resins are usable therefor.

The above-mentioned organic macromolecular substances can be colored in the following manner. The coloring material represented by the above general formula (1) is blended with the organic substance at such a ratio as to give the desired depth of shade. After heating and kneading, the blend is processed by any generally known method such as the injection molding, the compression molding, the extrusion molding or the calendar molding, whereby a colored substance with an extremely brilliant yellow color can be obtained in the form of a film, a sheet or the like.

Another method for obtaining a colored substance comprises preliminarily preparing a master batch of a high concentration diluting it so as to give the desired depth of shade and then processing it by the above-mentioned molding method.

Alternatively, a colored substance can be obtained by the cast molding method which comprises adding the coloring material represented by the above general formula (1) to a liquid monomer or premonomer, polymerizing the blend and hardening the resulting polymer.

When used as a toner for electrophotography, the coloring material of the general formula (1) is added simultaneously with, for example, magnetic powder and charge control agents. Next, the obtained blend is molded, ground in a hammer mill or an oscillating mill and classified.

In addition, a toner can be produced by coloring organic polymer particles having a predetermined particle size with the coloring material represented by the above general formula (1), as proposed in Japanese Patent Laid-Open No.106667/1988 and No.157669/1991.

When used as a fluorescent pigment, on the other hand, the above-mentioned colored substance is preliminarily ground in, for example, a jet mill and then further ground into smaller particles in a micro fluidizer. Thus a fluorescent pigment having a brilliant, light yellow color is produced.

The amount of the coloring material represented by the general formula (1) to be used in the present invention may range from 0.001 to 10 parts by weight, preferably from 0.01 to 5.0 parts by weight, based on 100 parts by weight of the organic macromolecular substance, though it varies depending on the desired depth of shade. However, the present invention is not restricted to this range.

In coloring an organic macromolecular substance by using the coloring material of the present invention, other additives suitable for various uses, such as antistatic agents, UV absorbers, antioxidants, lubricants, mold release agents, flame retardants, magnetic materials and charge control agents may be used together.

To further illustrate the present invention in further detail, the following Examples will be given though it is to be understood that the present invention is not restricted thereto.

In the following Production Example and Examples, all parts and percentages are given by weight.

Production Example 14.0 parts of 7-diethylamino-4-chloro-3-formylcoumarin, 150 parts of isopropyl alcohol, 8 parts of cyanomethylbenzimidazole and 4 parts of pyridine were heated at 100° C. for 5 hours, and then cooled to room temperature. Thus formed precipitates were collected by filtration and washed with isopropyl alcohol, to give 17.5 parts of a compound represented by the following formula (4):

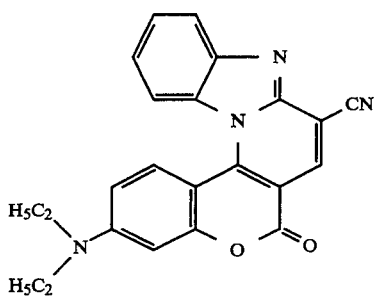

(4)

m.p.: 265°–267° C. (DSC).

EXAMPLE 1

10 parts of the coumarin compound represented by the above formula (4) was mixed with 50 parts of a naphthalensulfonic acid/formalin condensate, 40 parts of sodium ligninsulfonate and a small amount of water. The mixture was atomized by thoroughly wet-grinding and dried with a spray dryer. 2 parts of the dye thus obtained was added to 3,000 parts of water. Then, 100 parts of a polyester fabric was immersed therein and heated to 130° C. under elevated pressure. Then the fiber was dyed at the same temperature for 1 hour. Subsequently, the fabric was subjected to reduction clearing in a bath which had been prepared by mixing 6 parts of 45% caustic soda, 6 parts of hydrosulfite, 3 parts of an anionic surfactant and water to thereby give a total amount of 3,000 parts, at 80° C. for 10 minutes, washed with water and dried. Thus a dyed fabric having a brilliant yellow color was obtained. This dyed material had an extremely strong fluorescence. Further, it was excellent in dyeing affinity-and highly excellent in fastnesses to, for example, light and sublimation. The max of the compound represented by the formula (4) in 80% acetone was 494 nm.

The results of the fastness test are shown in Table 1.

TABLE 1

| | Results of fastness test | | | | | | |
|---|---|---|---|---|---|---|---|
| | To light (*1) | | To sublimation (*2) | | | | |
| | N/4 N | | 180° C., 30 sec. | | | 200° C., 30 sec. | |
| Depth of shade (N) | color change | color change | staining on polyester | nylon | color change | staining on polyester | nylon |
| Compd. (4) (N = 3.6% o.w.f) | 5 | 5 | 5 | 5 | 5 | 5 | 4–5 |

*1: Fastness to light: evaluated with respect to the extent of color change by using a blue scale after irradiating with a carbon arc lamp for 20 and 40 hours and expressed in grades 1 to 8 (JIS. L. 0842). Indication of results: 1 (very poor) to 5 (good). Actually, the dyes with the level 5 or above in grades of light fastness are practically effective.
*2: Fastness to sublimation: evaluated with respected to the extent of staining of white cloth by using a grey scale after treating at 180 and 200° C. each for 30 seconds and expressed in grades 1 to 5 (JIS L.0846). Indication of results: 1 (poor) to 5 (excellent).

EXAMPLE 2

10 parts of the dye obtained by atomizing in the same manner as described in Example 1 was added to 1,000 parts of water and dispersed therein. Next, a polyester fabric was immersed therein. After draining so as to give a weight gain of 70%, the fabric was first dried at 100° C. Then it was treated at 210° C. for 60 seconds, further subjected to reduction clearing and then thoroughly washed with water. Thus a fabric dyed in a brilliant yellow and having fluorescence was obtained.

EXAMPLE 3

A compound represented by the following formula (5):

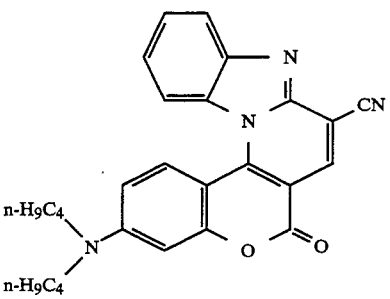

(5)

is atomized in the same manner as described in Example 1. 10 parts of the dye thus obtained is formulated into a paste together with 520 parts of water and 400 parts of crystal gum. Then a polyester fabric is printed therewith. After drying once, the fabric is subjected to high-temperature-steaming at 200° C. for 60 seconds and then thoroughly washed. Thus a fabric dyed in a brilliant yellow and having fluorescence is obtained. The max of the compound represented by the formula (5) in 80% acetone is 495 nm.

EXAMPLE 4 to 8

Coumarin compounds represented by the following general formula (6):

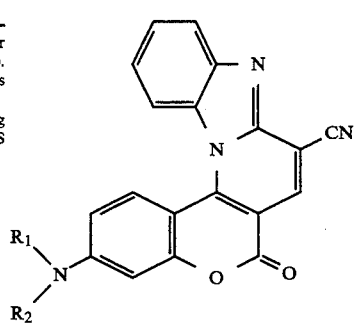

(6)

wherein $R_1$ and $R_2$ are each as defined in the following table, were synthesized and atomized in the same manner as described in Example 1. Then polyester fabrics are dyed therewith by the same procedures as those employed in Examples 1 to 3. Thus a fabric dyed in an extremely brilliant or orange and having fluorescence was obtained in each case.

| Example No. | $R_1$ | $R_2$ | $\lambda_{max}$ (in 80% acetone); nm |
| --- | --- | --- | --- |
| 4 | CH₃ | CH₃ | 488 |
| 5 | " | C₂H₅ | 490 |
| 6 | H | " | 486 |
| 7 | C₄H₉ | " | 495 |
| 8 | C₃H₇ | " | 494 |

EXAMPLE 9

100 parts of a polystyrene resin Styron 666 (mfd. by Asahi Chemical Industry, Co., Ltd.) was mixed with 0.05 part of the compound obtained in the above Production Example [in the general formula (1), $R_1=R_2=C_2H_5$] in a tumbler for 10 minutes. In a screw line type injection molding machine with a cylinder temperature adjusted to 200° C., the mixture was melt-kneaded and then injected. Thus a colored substance having an extremely brilliant fluorescent yellow color was obtained.

| Depth of shade (N) | Fastness to heating (*1) | To light (*2) |
| --- | --- | --- |
| Compds(4) | 300° C., 30 sec. | 300° C., 10 min. |
| N = 0.5% | 4 | 3  6 |

*1: Fastness to heating: 0.05 part of the compound (4) and 0.5 part of titanium R type are blended into 100 parts of a polystyrene resin styron 666 (mfd. by Asahi Chemical Co., Ltd.) and the resin is treated with heating cylinder in the inline-screwtype injector at 300° C. for 30 seconds and 10 minutes each, thereafter continuous molding is carried out and the fastness is evaluated with respect to the extent of color change based on the alteration after treating at 200° C. for 30 seconds by using a grey scale and expressed in grades 1 to 5.
*2: Fastness to light: the extent of color change is evaluated by using a blue scale after exposing with a carbon arc light for 20 and 80 hours and expressed in grades 1 to 8. Indication of results: 1 (very poor) to 6 (very good)

EXAMPLE 10

100 parts of a polyamide resin Amilan CM-1017 (mfd. by Toray Industries, Inc.) is mixed with 0.01 part of the compound obtained in the above Production Example [in the general formula (1), $R_1=R_2=C_2H_5$] in a tumbler for 10 minutes. In a screw line type injection molding machine with a cylinder temperature adjusted to 240° C., the mixture was melt-kneaded and then injected. Thus a colored substance having an extremely brilliant and fluorescent yellow color is obtained.

EXAMPLE 11

100 parts of a polycarbonate resin Upilon 2000 (mfd. by Mitsubishi Gas Chemical Co., Inc.) is mixed with 0.3 part of the compound obtained in the above Production Example [in the general formula (1), $R_1=R_2=CH_3$] in a tumbler for 10 minutes. In a screw line type injection molding machine with a cylinder temperature adjusted to 280° C., the mixture is melt-kneaded and then injected. Thus a colored substance having an extremely brilliant and fluorescent yellow color is obtained.

EXAMPLE 12

100 parts of a styrene/n-butyl methacrylate copolymer Himer SBM73 (mfd. by Sanyo Chemical Industries, Ltd.), 2 parts of a charge control agent (chromium 3,5-di-tert-butylsalicylate chelate) and 1 part of the compound [in the above general formula (1), $R_1=R_2=CH_3$] obtained by the same manner as described in the Production Example are mixed together in a tumbler for 5 minutes and then melt-kneaded in a roll mill at 100° C. Thus a colored substance having an extremely brilliant yellow color is obtained. This colored composition is ground in a jet mill to thereby give a classified product having an average particle size of 9 μm. To 100 parts of this classified product is externally added 0.5 part of Aerosil R-972 (mfd. by Nippon Aerosil) in a Henschel mixer. Then the mixture is mixed with an iron powder carrier to thereby give a developing agent.

When this developing agent is used in copying on a full color copying machine, an image of an extremely brilliant yellow color is obtained.

EXAMPLE 13

By using 100 parts of an unsaturated polyester resin Tafton NE-382 (mfd. by Kao Corporation), 2 parts of a charge control agent (chromium 3,5-di-tert-butylsalicylate chelate) and 2 parts of the compound [in the above general formula (1), $R_1=R_2=C_3H_7$] obtained by the same method as the one described in the Production Example, a developing agent is obtained by the same manner described in Example 12.

When this developing agent is used in copying on a full color copying machine, an image of an extremely brilliant yellow color is obtained.

EXAMPLE 14

A mixture comprising 75 parts of a styrene monomer, 25 parts of n-butyl acrylate and 3 parts of the compound [in the above general formula (1), $R_1=R_2=C_3H_7$] obtained by the same manner described in the Production Example is dispersed in a ball mill for 12 hours. In the obtained dispersion is dissolved 1.5 parts of azobisisobutylonitrile. To thus obtained mixture is added 400 parts of 3% polyvinyl alcohol and the resulting mixture is stirred in a TK Homomixer (mfd. by Tokushu Kika Kogyo) at 9,000 rpm for 20 minutes.

The obtained suspension is transferred into a flask and polymerized under a nitrogen atmosphere with stirring at 90 rpm at 70° C. for 6 hours. After the completion of the polymerization, the products are collected by filtration, washed and dried, to obtain a fluorescent pigment of an average particle size of 6 μm having an extremely brilliant color and fluorescence.

EXAMPLE 15

70 parts of fine polystyrene particles (MPS1275 mfd. by Sumitomo Chemical Co., Ltd.) of an average particle size of 10 μm, which have been preliminarily granulated by means of the suspension polymerization method, are dispersed in 80 parts of water. To this dispersion is added 3 parts of a dye prepared by atomizing and dispersing the compound [in the above general formula (1), $R_1=R_2=C_2H_5$] together with a surfactant on a sand grind mill. The resulting dispersion is gradually heated to 75° C. with stirring and then maintained at this temperature for 2 hours. Subsequently it is cooled, filtered, washed and dried to give a yellow material having an extremely brilliant color and fluorescence.

The use of the coumarin dye of the present invention has made it possible to provide a method whereby a hydrophobic fiber can be dyed in an extremely brilliant yellow or orange with fluorescence and excellent various fastnesses. Further, coloring an organic macromolecular substance with the coumarin compound of the present invention make it possible to provide a colored substance (resin), a colored toner for electrophotography and a fluorescent pigment having an extremely brilliant color and fluorescence.

What we claim is:

1. A method for dyeing or coloring an organic macromolecular substance characterized by contacting said substance with a coumarin compound represented by the general formula (1):

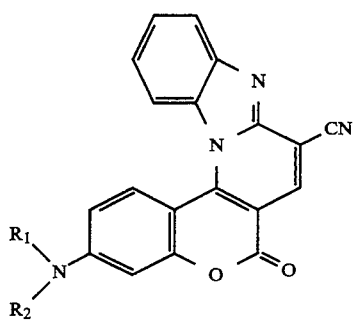

wherein $R_1$ and $R_2$ independently represent each a hydrogen atom or an alkyl group having 1 to 4 carbon atoms;

2. A method as claimed in claim 1 wherein $R_1$ and $R_2$ in the general formula (1) each represent an ethyl group.

3. A method as claimed in claim 1 wherein $R_1$ and $R_2$ in the general formula (1) each represent an n-butyl group.

4. A dyeing method as claimed in any of claims 1, 2 or 3 wherein said organic macromolecular substance is at least one hydrophobic fiber selected from the group consisting of polyester fibers, polyamide fibers, cellulose diacetate fibers and cellulose triacetate fibers.

5. A coloring method as claimed in any of claims 1, 2 or 3 wherein said organic macromolecular substance is at least one polymer selected from the group consisting of polyester resins, polyamide resins, polystyrene resins, polyurethane resins, polyacrylonitrile resins, polyolefin resins, polyacrylate resins, polyvinyl chloride resins, polyethylene resins, polycarbonate resins and polyacetal resins; or copolymer obtained using a monomer of the said polymer.

6. A coloring material for organic macromolecular substances which contains a coumarin compound represented by the general formula (1):

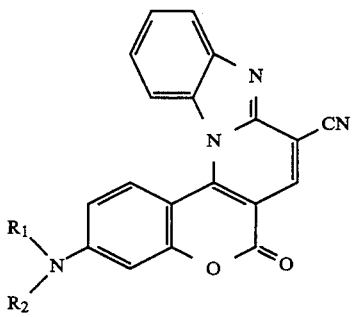

7. A coloring material as claimed in claim 6 wherein $R_1$ and $R_l$ in the general formula (1) each represent an ethyl group.

8. A coloring material as claimed in claim 6 wherein $R_1$ and $R_2$ in the general formula (1) each represent an n-butyl group.

* * * * *